United States Patent
Park (10) Patent No.: US 8,259,698 B2
(45) Date of Patent: Sep. 4, 2012

(54) METHOD OF TRANSMITTING CHANNEL INFORMATION IN WIRELESS COMMUNICATION SYSTEM

(75) Inventor: Yong Bae Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 789 days.

(21) Appl. No.: 12/179,426

(22) Filed: Jul. 24, 2008

(65) Prior Publication Data
US 2009/0040998 A1 Feb. 12, 2009

(30) Foreign Application Priority Data

Aug. 6, 2007 (KR) .................. 10-2007-0078508

(51) Int. Cl.
*H04Q 7/20* (2006.01)
(52) U.S. Cl. ........................................... 370/345
(58) Field of Classification Search .................. None
See application file for complete search history.

(56) References Cited

U.S. PATENT DOCUMENTS

| | | | |
|---|---|---|---|
| 2003/0117980 A1* | 6/2003 | Kim et al. | 370/332 |
| 2005/0201295 A1* | 9/2005 | Kim et al. | 370/241 |
| 2005/0260998 A1* | 11/2005 | Casaccia et al. | 455/452.2 |
| 2007/0230324 A1* | 10/2007 | Li et al. | 370/204 |

FOREIGN PATENT DOCUMENTS

CN 1805426 7/2006

* cited by examiner

*Primary Examiner* — John Blanton
*Assistant Examiner* — Alan Lindenbaum
(74) *Attorney, Agent, or Firm* — Lee, Hong, Degerman, Kang & Waimey (57) ABSTRACT

A method of transmitting channel information in a wireless communication system includes generating a channel quality indicator (CQI) including a channel variation indicating temporal changes in downlink channel condition, and transmitting the CQI through an uplink physical channel. Since a modulation and coding scheme is determined by considering changes in channel environment, reception performance of a user equipment can be improved and reliable service can be provided.

7 Claims, 12 Drawing Sheets

FIG. 1
PRIOR ART

| RTBS(32) | RMF(16) | ACK/NACK(36) |
|---|---|---|

| RTBS(32) | RMF(12) | CHV(20) | ACK/NACK(20) |

FIG. 11

| RTBS(32) | RMF(16) | ACK/NACK(36) |
|---|---|---|

| RTBS(32) | CHV(16) | ACK/NACK(36) |
|---|---|---|

FIG. 12

| RTBS+CHV(32) | RMF(16) | ACK/NACK(36) |
|---|---|---|

METHOD OF TRANSMITTING CHANNEL INFORMATION IN WIRELESS COMMUNICATION SYSTEM

CROSS-REFERENCE TO RELATED APPLICATIONS

This application claims the benefit of priority of Korean Patent Application No. 10-2007-0078508 filed on Aug. 6, 2007, which is incorporated by reference in its entirety herein.

BACKGROUND

1. Technical Field

The present invention relates to wireless communications, and more particularly, to a method of transmitting channel information in a wireless communication system.

2. Related Art

Today, wireless communication systems have been evolving from the early voice-oriented services into high-speed, high-quality wireless data packet communication systems for providing data services and multimedia services. Moreover, for next generation wireless communication systems, standardization is in progress for high-speed, high quality wireless data packet services. High-speed downlink packet access (HSDPA) represents an evolution of the existing asynchronous international mobile telecommunications (IMT)-2000 standard and is an access scheme which is additionally provided for high-speed downlink data transmission. The HSDPA is classified into a frequency division duplex (FDD) HSDPA and a time division duplex (TDD) HSDPA. The TDD HSDPA can support a chip rate of 3.84 million chips per second (Mcps) or 1.28 Mcps. In the TDD HSDPA, uplink and/or downlink resources can be asymmetrically allocated. Thus, when downlink channels are allocated to the maximum extent possible, transmission can be achieved in a most efficient manner with the introduction of the HSDPA. The TDD HSDPA with the chip rate of 1.28 Mcps is generally referred to as time division-synchronous code division multiple access (TD-SCDMA).

The TDD HSDPA supports a hybrid automatic repeat request (HARQ) scheme and an adaptive modulation and coding (AMC) scheme. In the HARQ scheme, a receiver receives packet data and then informs a transmitter of whether the packet data is successfully received, so that the packet data can be retransmitted when necessary. In the AMC scheme, a modulation and coding scheme (MCS) level is dynamically changed according to a channel condition. When a user equipment (UE) has a good channel condition, a data rate can be increased by using a high modulation order and a high code rate. On the other hand, a relatively low modulation order and a relatively low code rate are used when the UE is located in a cell boundary. When using the AMC scheme, the UE has to feed back a channel quality indicator (CQI) to a Base Station (BS). The CQI is a representative value indicating downlink channel condition. The CQI may be used to directly report the MCS level. The CQI may be configured in various formats.

A high speed downlink shared channel (HS-DSCH) is a downlink transport channel for supporting the HSDPA. The HS-DSCH is associated with at least one shared control channel for HS-DSCH (HS-SCCH). The HS-SCCH is a downlink physical channel for carrying upper-layer control information for the HS-DSCH. A shared information channel for HS-DSCH (HS-SICH) is an uplink physical channel for carrying an acknowledgment (ACK)/negative-acknowledgment NACK) signal.

Figure 1:
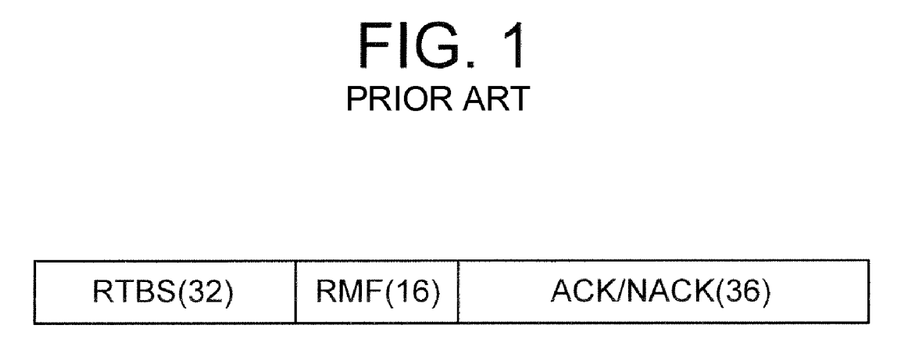
FIG. 1 shows a conventional structure of a burst for an HS-SICH.

FIG. 1 shows a conventional structure of a burst for an HS-SICH. A burst transmitted on the HS-SICH has a duration of 84 bits in total, that is, 48 bits for a CQI and 36 bits for an ACK/NACK signal. In the TDD HSDPA, the CQI consists of a recommended modulation format (RMF) and a recommended transport block size (RTBS). The RMF is 1-bit information related to a modulation scheme. The 1-bit RMF is extended to 16 bits by using a repetition code. The RTBS is 6-bit information related to a coding scheme. The 6-bit RTBS is extended to 32 bits by using a Reed-Muller code. The ACK/NACK signal is 1-bit information. The 1-bit ACK/NACK signal is extended to 36 bits by using the repetition code.

In order for the AMC scheme to have improved efficiency, the CQI needs to be configured to indicate channel condition more accurately. This is because the channel condition changes due not only to white noise but also to various factors such as power variation of a received signal, a Doppler effect, and interference. The power variation is caused by fading. The Doppler effect is caused by shadowing, movement of a UE, and a frequently changing speed. The interference is caused by other users and multiple paths. In addition, in a channel environment where the UE has a high mobility, a downlink channel condition currently transmitted by the UE may differ from a downlink channel condition in which the BS transmits data in practice at a later time.

Accordingly, a channel path currently estimated by a receiver may differ from a channel path through which a transmitter transmits data at a later time. Therefore, in order to improve performance of the AMC scheme, there is a need to consider that a channel environment may change according to a moving speed of the UE.

SUMMARY

The present invention provides a method of transmitting channel information in a wireless communication system in consideration of changes in a channel environment.

The present invention also provides a method of transmitting data in a wireless communication system in consideration of changes in a channel environment.

According to an aspect of the present invention, a method of transmitting channel information in a wireless communication system is provided. The method includes generating a channel quality indicator (CQI) including a channel variation indicating temporal changes in downlink channel condition, and transmitting the CQI through an uplink physical channel.

According to another aspect of the present invention, a method of transmitting data in a wireless communication system is provided. The method includes receiving a CQI including a channel variation indicating temporal changes in downlink channel condition, determining a modulation and coding scheme according to the CQI, and transmitting downlink data by using the modulation and coding scheme.

DESCRIPTION OF EXEMPLARY EMBODIMENTS

Figure 2:
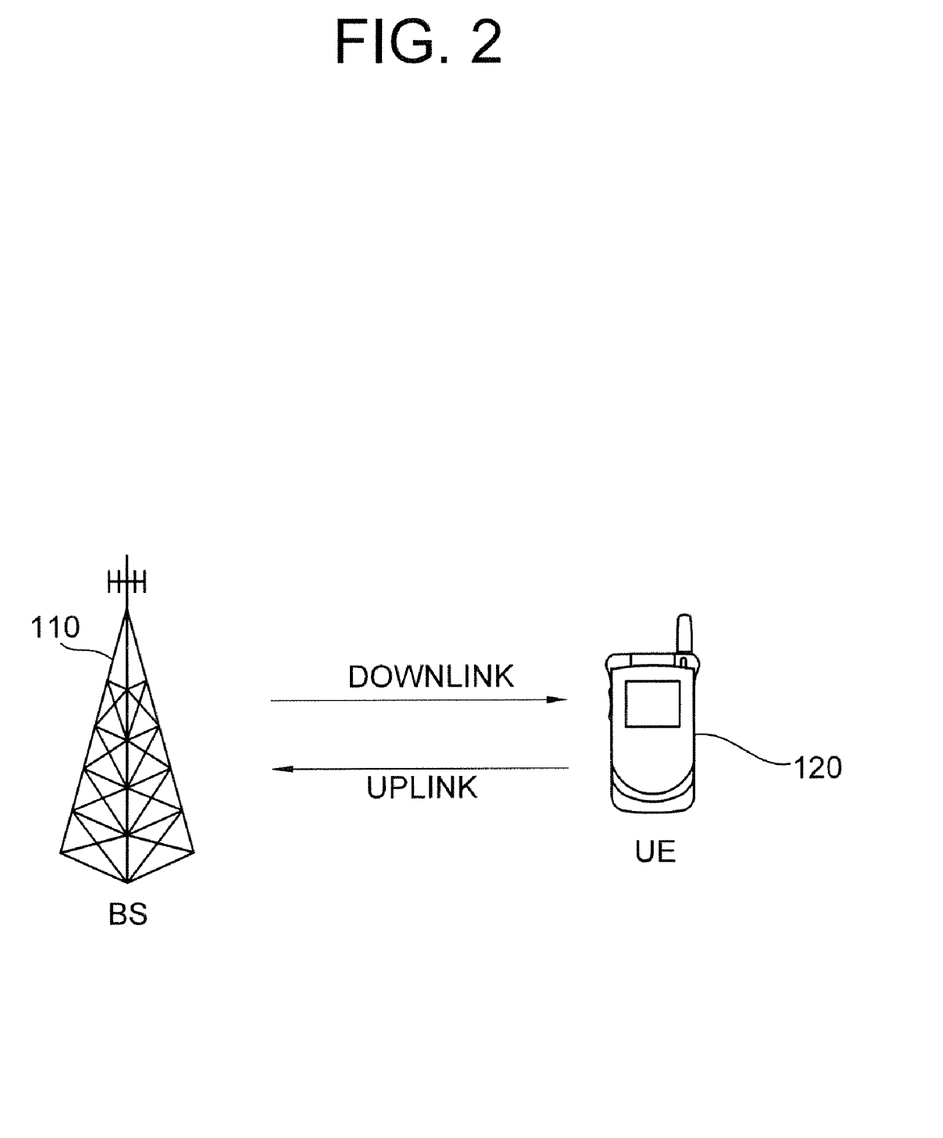
FIG. 2 shows a wireless communication system.

FIG. 2 shows a wireless communication system. The wireless communication system can be widely deployed to provide a variety of communication services, such as voices, packet data, etc.

Referring to FIG. 2, the wireless communication system includes a base station (BS) 110 and a user equipment (UE) 120. The BS 110 is generally a fixed station that communicates with the UE 120 and may be referred to as another terminology, such as a node-B, a base transceiver system (BTS), an access point, etc. The UE 120 may be fixed or mobile and may be referred to as another terminology, such as a mobile station (MS), a user terminal (UT), a subscriber station (SS), a wireless device, etc.

Hereinafter, downlink is defined as a communication link from the BS 110 to the UE 120, and uplink is defined as a communication link from the UE 120 to the BS 110. In downlink, a transmitter may be a part of the BS 110 and a receiver may be a part of the UE 120. In uplink, the transmitter may be a part of the UE 120 and the receiver may be a part of the BS 110.

Figure 3:
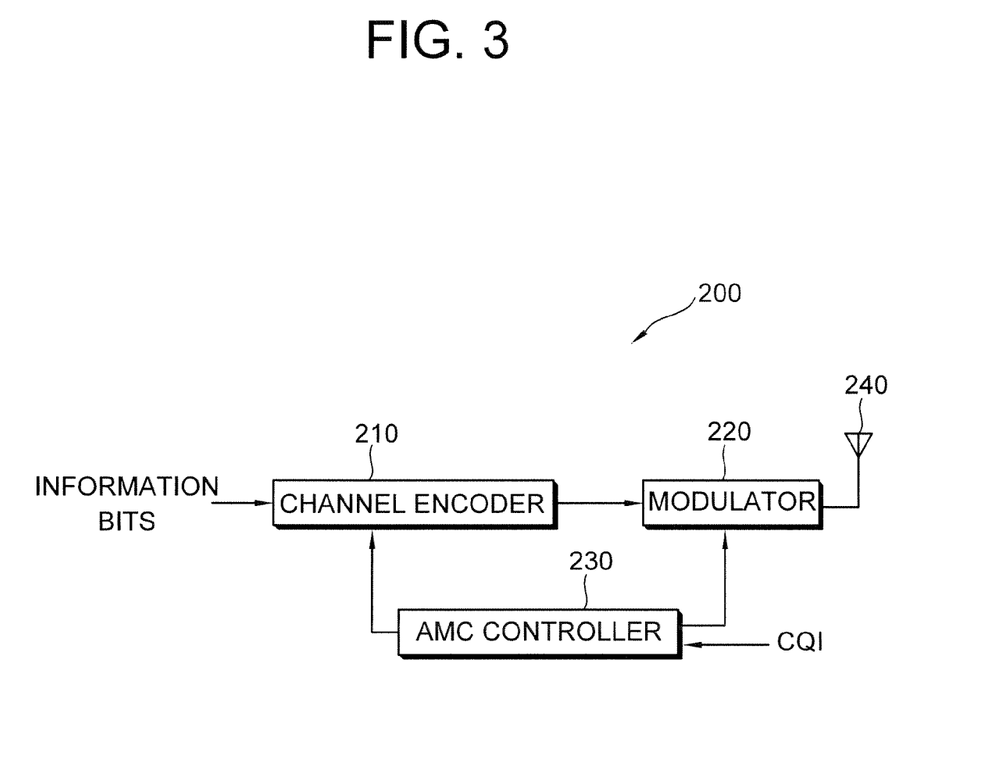
FIG. 3 is a block diagram showing a transmitter according to an embodiment of the present invention.

FIG. 3 is a block diagram showing a transmitter according to an embodiment of the present invention.

Referring to FIG. 3, a transmitter 200 includes a channel encoder 210, a modulator 220, and an adaptive modulation and coding (AMC) controller 230. The channel encoder 210 receives a stream of information bits and encodes the received stream of information bits according to a coding scheme under the control of the AMC controller 230, thereby generating coded data. The information bits may include text, audio, video, or other data. The channel encoder 210 appends error detection bits (e.g., cyclic redundancy check (CRC)) to the information bits. Further, the channel encoder 210 may append an extra code for error correction. The error correction code may be a turbo code. The turbo code is a systematic code including the information bits as systematic bits. If the turbo code has a code rate of 1/3, two parity bits are assigned to one systematic bit. The error correction code is not limited to the turbo code. Thus, the present invention may also be applied when a low density parity check code (LDPC) or other convolution codes are used. An interleaver (not shown) may be connected to an output node of the channel encoder 210. The interleaver mixes the coded data to reduce noise derived from a channel.

The modulator 220 modulates the coded data according to a modulation scheme under the control of the AMC controller 230 and thus provides modulation symbols. The coded data is mapped by the modulator 220 to the modulation symbols representing locations in an amplitude and phase constellation. The symbols output from the modulator 220 are transmitted through a transmit (Tx) antenna 240.

Figure 4:
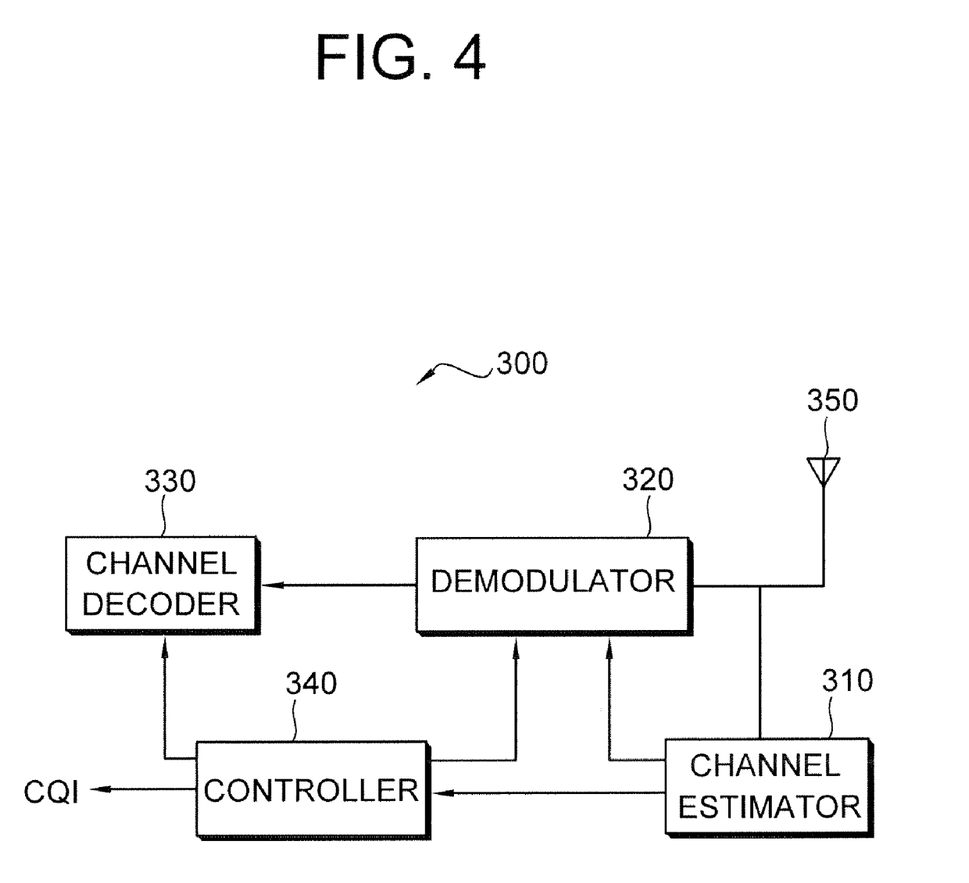
FIG. 4 is a block diagram showing a receiver according to an embodiment of the present invention.

The AMC controller 230 determines the coding scheme and the modulation scheme according to a channel quality indicator (CQI) fed back from a receiver 300 (see FIG. 4). Then, the AMC controller 230 provides the channel encoder 210 with the coding scheme and provides the modulator 220 with the modulation scheme. The CQI consists of a channel variation, a recommended modulation format (RMF), and a recommended transport block size (RTBS). The channel variation indicates temporal changes in a channel condition. The RMF is 1-bit information indicating the modulation scheme and can be expressed as shown in Table 1 below.

TABLE 1

| RMF | modulation scheme |
|---|---|
| 0 | QPSK |
| 1 | 16-QAM |

Table 1 above is provided for exemplary purposes only. Thus, the modulation scheme and the number of bits of the RMF may vary. The modulation scheme is not limited, and thus m-quadrature phase shift keying (m-PSK) or m-quadrature amplitude modulation (m-QAM) may also be used. The m-PSK may be not only quadrature phase-shift keying (QPSK) but also binary phase shift keying (BPSK) or 8-PSK. The m-QAM may be 16-QAM, 64-QAM, or 256-QAM.

FIG. 4 is a block diagram showing a receiver according to an embodiment of the present invention.

Referring to FIG. 4, a receiver 300 includes a channel estimator 310, a demodulator 320, a channel decoder 330, and a controller 340. The channel estimator 310 estimates a channel by using a pilot received from a receive (Rx) antenna 350. The demodulator 320 demodulates an Rx signal under the control of a demodulation signal provided from the controller 340. The channel decoder 330 decodes data under the control of a decoding signal provided from the controller 340.

The controller 340 generates a CQI by using the channel estimated by the channel estimator 310. Further, the controller 340 generates an acknowledgement (ACK)/negative acknowledgement (NACK) signal for hybrid automatic repeat request (HARQ) by detecting errors from the decoded data. The CQI and the ACK/NACK signal are fed back to the transmitter 200 (see FIG. 3) through a high speed shared information channel (HS-SICH).

Figure 5:
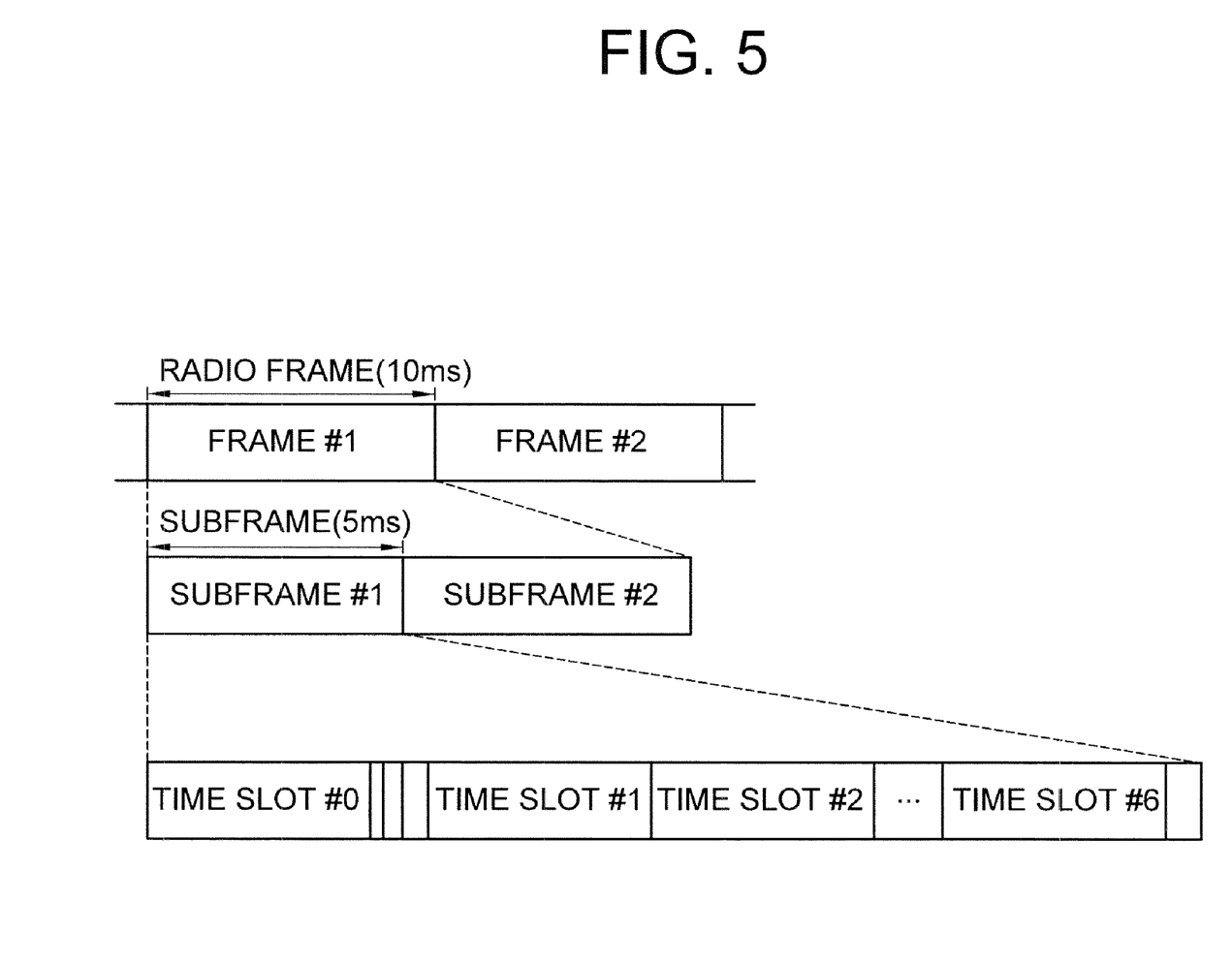
FIG. 5 shows a structure of a radio frame in a time division duplex (TDD) wireless communication system.

FIG. 5 shows a structure of a radio frame in a time division duplex (TDD) wireless communication system.

Referring to FIG. 5, the radio frame includes two subframes. The radio frame has a duration of 10 ms. The subframe has a duration of 5 ms. The subframe includes 7 time slots. The time slot can be classified into an uplink time slot for uplink transmission and a downlink time slot for downlink transmission. Since the uplink time slot and the downlink time slot are arranged in the same frequency band at different time, it is called time division duplex (TDD).

In the TDD wireless communication system, the total number and length of radio frames, subframes, time slots, or switching points are not limited to the above mentioned examples. Therefore, the total number and length of the radio frames, the subframes, the switching points, or the time slots may vary depending on situations.

Figure 6:
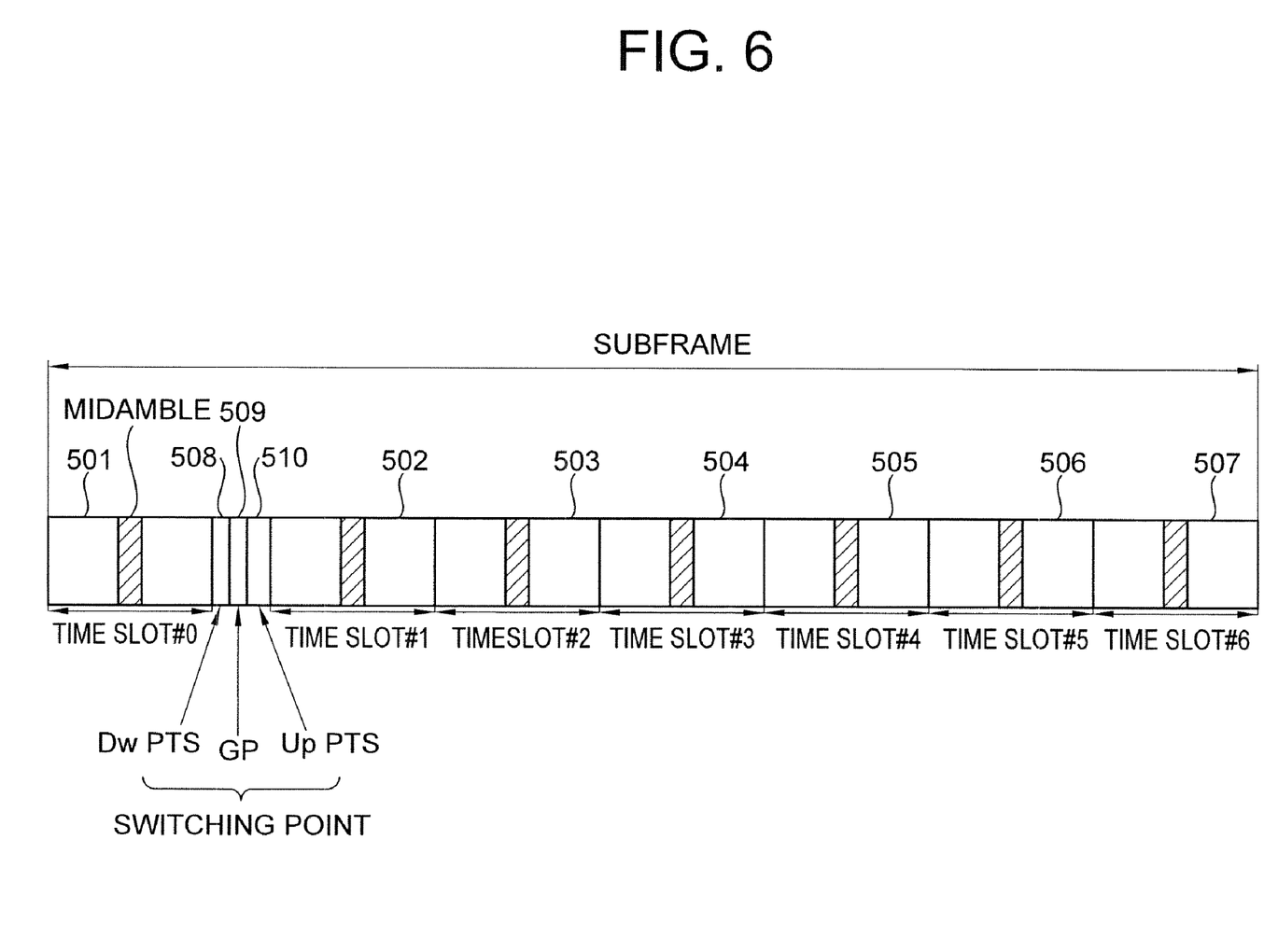
FIG. 6 shows a structure of a subframe.

FIG. 6 shows a structure of a subframe.

Referring to FIG. 6, the subframe includes 7 time slots #0 to #6 (also indicated by reference numerals 501 to 507). Each of the time slots 501 to 507 includes a midamble for channel estimation. Among the 7 time slots 501 to 507, the time slot #0 501 is always allocated to downlink and the time slot #1 502 is always allocated to uplink. The time slot #2 503 to the time slot #6 507 can be allocated to either uplink or downlink. A primary common control physical channel (P-CCPCH), to which a common transport channel is mapped, is allocated to the time slot #1 502.

An uplink time slot and a downlink time slot are separated by a switching point. The switching point is a specific period located between a downlink time slot and an uplink time slot to separate uplink and downlink. Each subframe has at least one switching point. The switching point includes a downlink pilot time slot (DwPTS) 508, a guard period (GP) 509, and an uplink pilot time slot (UpPTS) 510. The DwPTS 508 is used for initial cell search, synchronization, or channel estimation performed in a UE. The UpPTS 510 is used for channel estimation performed in a BS and uplink transmission synchronization of the UE. The GP 509 is used to cancel interference that occurs in uplink due to a multi-path delay of a downlink signal while uplink and downlink communications are performed.

The subframe can include a maximum of 6 downlink time slots including the time slot #0 501. This is because the time slot #0 501 is always assigned to downlink, and the time slot #2 503 to the time slot #6 507 can be assigned to downlink. Therefore, a maximum of 6n downlink time slots can exist for n subframes. For example, 30 downlink time slots can exist for 5 subframes.

In TDD, a physical channel is used when a burst is transmitted in a specific time slot within an assigned radio frame. The burst consists of two data symbols, a midamble, and a GP. A duration of one burst is one time slot.

Figure 7:
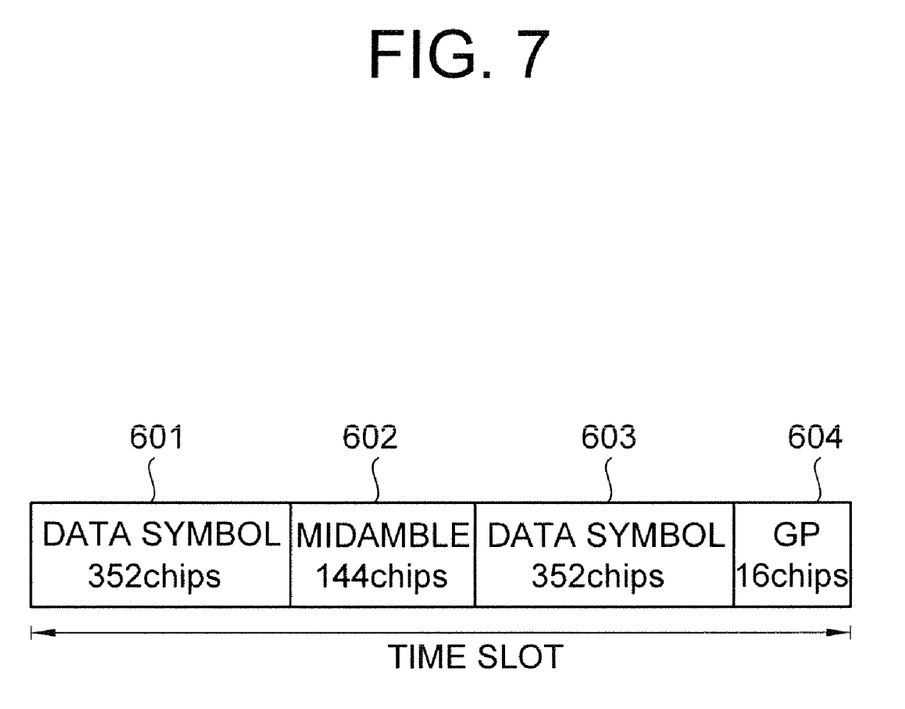
FIG. 7 shows a structure of a burst.

FIG. 7 shows a structure of a burst.

Referring to FIG. 7, the burst consists of data symbols 601 and 603, a midamble 602, and a guard point (GP) 604.

Each of the data symbols 601 and 603 has a duration of 352 chips and is used for data transmission. A total of 88 bits of data can be transmitted by using one burst. The midamble 602 has a duration of 144 chips and is used for identifying UEs that use the same time slot or is used for channel estimation. The midamble 602 is also referred to as a reference signal or a pilot. The GP 604 is an interval for distinguishing a time slot for current transmission from a subsequent time slot for next transmission. If an uplink time slot is followed by a downlink time slot, or vice versa, the GP 604 distinguishes the time slots so that an interference signal is not produced between the time slots.

Figure 8:
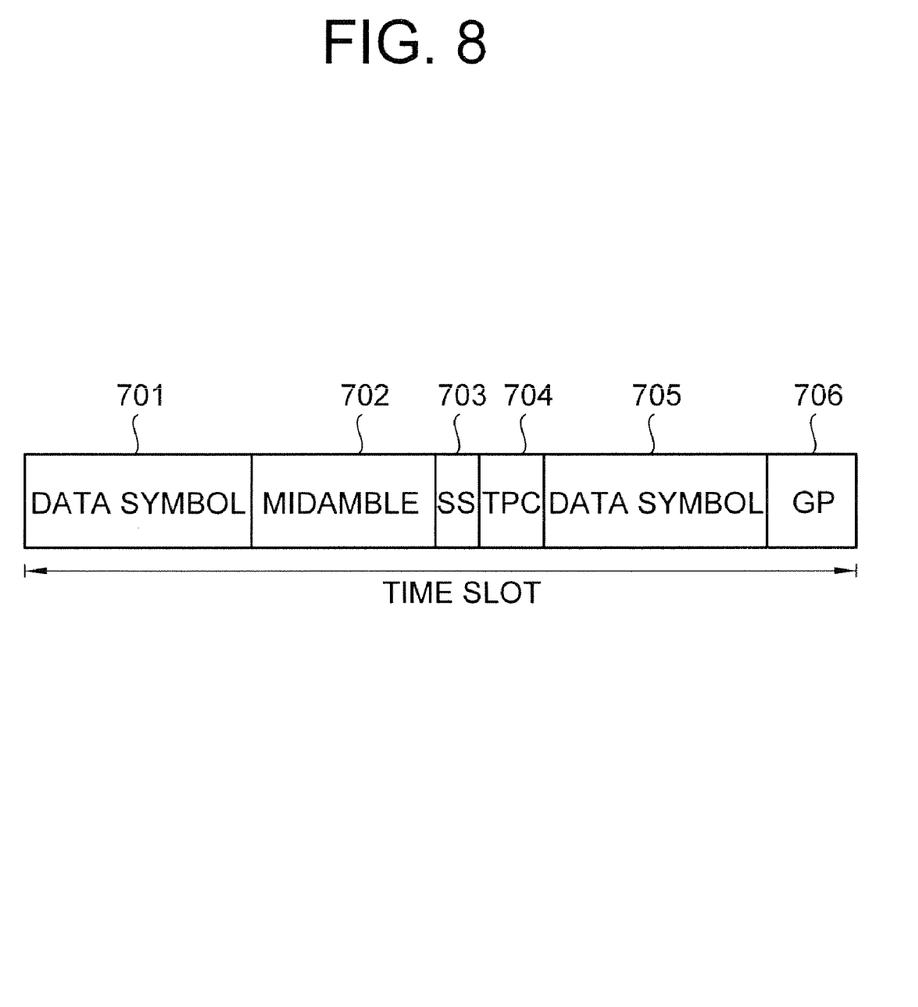
FIG. 8 shows a structure of a burst for an HS-SICH.

FIG. 8 shows a structure of a burst for an HS-SICH. The HS-SICH is an uplink physical channel for carrying a CQI for a high speed downlink shared channel (HS-DSCH) or an ACK/NACK signal for HARQ. The HS-SICH is an uplink shared channel.

Referring to FIG. 8, the burst used in the HS-SICH includes data symbols 701 and 705, a midamble 702, a synchronization shift (SS) 703, a transmit power control (TPC) 704, and a guard period (GP) 706. The data symbols 701 and 705 are used to transmit data (i.e., the CQI and the ACK/NACK signal). The midamble 702 is used to identify UEs and/or to estimate a channel for data demodulation. The GP 706 is an interval for distinguishing a time slot for current transmission from a subsequent time slot for next transmission. The SS 703 is used to transmit a command for adjusting synchronization when an out-of-synch condition occurs due to changes in a distance between a UE and a BS or due to other reasons. The TPC 704 is used to control downlink power of the BS.

For each time slot, one burst can transmit a total of 88 bits, that is, 2 bits for the SS 703, 2 bits for the TPC 704, and 84 bits for the data symbols 701 and 705. The CQI and the ACK/NACK signal are assigned to the two data symbols 701 and 705. The assignment of the CQI and the ACK/NACK signal onto the two data symbols 701 and 705 will be described later.

Figure 9:
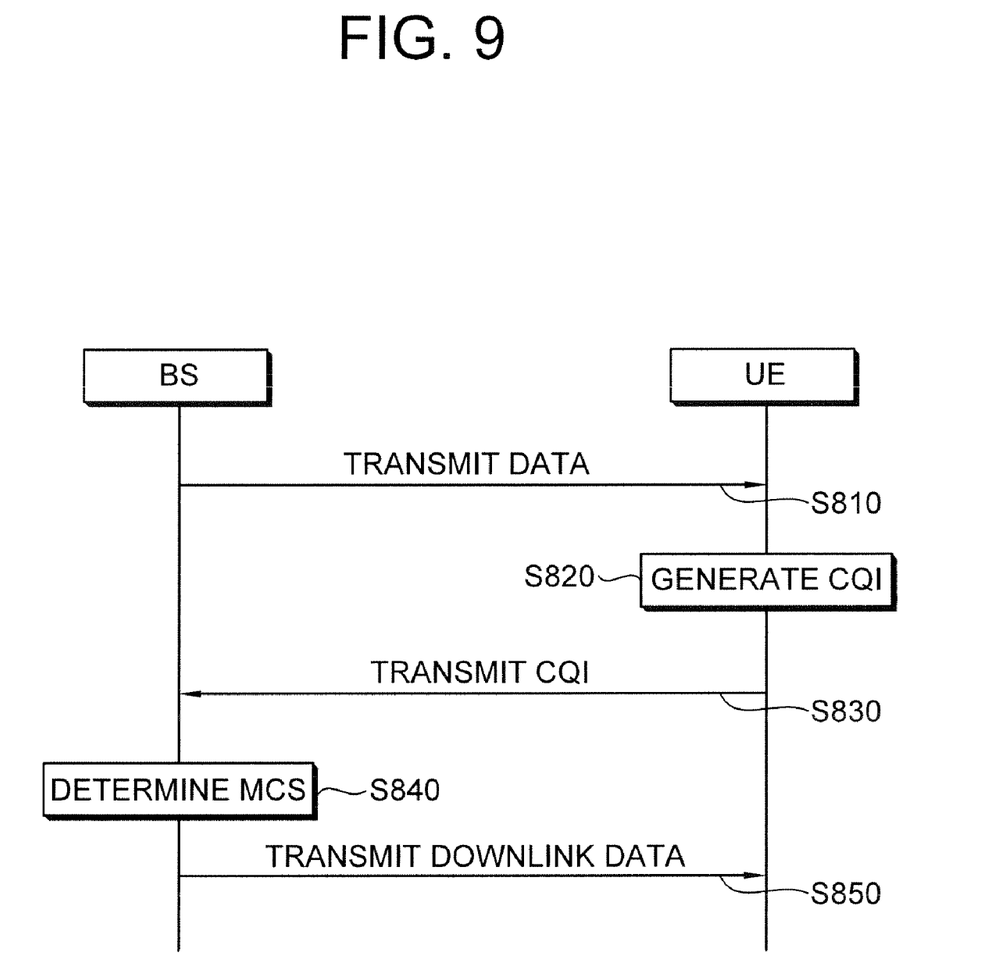
FIG. 9 is a flow diagram showing a method of transmitting channel information according to an embodiment of the present invention.

FIG. 9 is a flow diagram showing a method of transmitting channel information according to an embodiment of the present invention.

Referring to FIG. 9, a BS transmits downlink data through a HS-DSCH (step S810).

A UE generates a CQI by using a midamble for at least one time slot on a subframe in which the downlink data is transmitted (step S820). The CQI is information used when the UE informs the BS of a downlink channel condition so that the BS can allocate downlink resources. The CQI consists of a channel variation, an RMF, and an RTBS. First, the UE measures a signal to interference plus noise ratio (SINR) by using a P-CCPCH. Subsequently, the UE obtains the channel variation, the RMF, and the RTBS according to the measured SINR.

The channel variation indicates temporal changes in a channel condition. The channel variation is obtained in such as manner that received signal strength indications (RSSIs) of midambles for all downlink time slots are measured, and then a dispersion of the RSSIs of the midambles for the downlink time slots is calculated from the RSSIs. An RSSI $A_i$ of a midamble for an $i^{th}$ downlink time slot can be obtained according to Equation 1 below.

$$A_i = \sqrt{I^2 + Q^2} \qquad \text{[Equation 1]}$$

In Equation 1, I denotes an in-phase component of an Rx signal, and Q denotes a quadrature-phase component of the Rx signal.

Next, a moving average of the midambles for the downlink time slots is calculated. A moving average M of midambles for m downlink time slots can be calculated according to Equation 2 below.

$$M = \frac{1}{m} \sum_{i=0}^{m-1} A_i \qquad \text{[Equation 2]}$$

In Equation 2, m denotes the total number of downlink time slots to be averaged.

For example, if the number of midambles for the downlink time slots is 30, the moving average M of the midambles for the downlink time slots can be obtained by $$M = \frac{1}{30} \sum_{i=0}^{29} A_i.$$

Next, a dispersion v of RSSIs can be calculated by using the aforementioned values according to Equation 3 below.

$$v^2 = \frac{1}{m} \sum_{i=0}^{m-1} (M - A_i)^2 \qquad \text{[Equation 3]}$$

For example, if the number of midambles for the downlink time slots is 30, the dispersion of the RSSIs can be obtained by $$v^2 = \frac{1}{30}\sum_{i=0}^{29}(M - A_i)^2.$$

The dispersion of the RSSIs is the channel variation. The channel variation can be configured into the CQI. In this case, the obtained dispersion of the RSSIs is divided into four states by using 2-bit mapping, such as s=[00, 01, 10, 11].

The UE transmits the CQI through the HS-SICH (step S830). The HS-SICH can transmit not only the CQI but also an ACK/NACK signal. Thus, through the HS-SICH, the UE can also inform the BS of whether downlink data is received.

The BS determines a modulation and coding scheme (MCS) for the downlink data by using information (i.e., the channel variation, the RMF, and the RTBS) included in the CQI (step S840). The BS transmits the downlink data through the HS-DSCH by using the determined MCS (step S850).

The channel variation indicates a channel change detected over a plurality of time slots. A channel variation for 30 midambles is a value indicating a channel change detected over a minimum of 5 subframes. Since the UE informs the BS of the channel variation of the UE, the BS can further accurately recognize a channel condition of each UE by using not only the RMF and the RTBS but also the channel variation.

Even if power of the BS is constant, the SINR of the HS-DSCH varies over time due to interference caused by neighbor cells or multiple paths when the UE is moving. If the US moves fast, the use of only the RMF and the RTBS is not sufficient for the BS to correctly recognize the changes in a channel condition when the channel condition changes significantly. Therefore, to increase the efficiency of the AMC scheme, the temporal channel variation is appended to the CQI, and the resultant CQI is reported to the BS. Consequently, reception performance of the UE is improved, and thus the UE can receive a service in a reliable manner.

Now, a method of transmitting a CQI including a channel variation through a HS-SICH will be described. As described above, a burst used in the HS-SICH can transmit 84-bit data (i.e., the CQI and an ACK/NACK signal) by using two data symbols.

Figure 10:
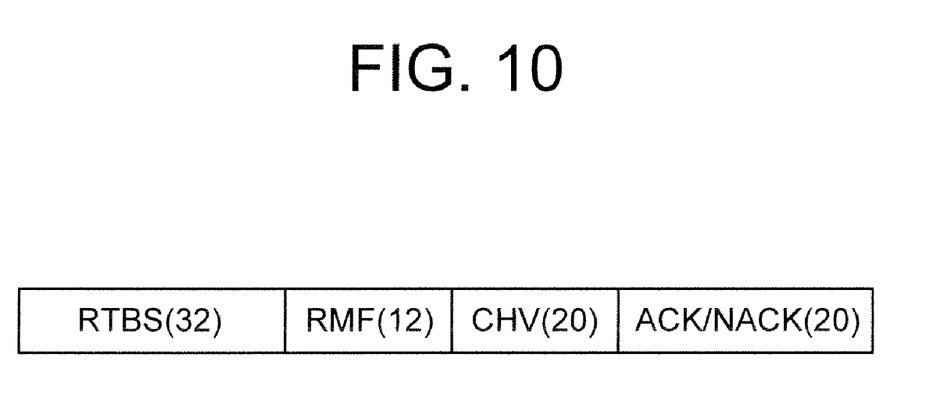
FIG. 10 shows an example of an HS-SICH configuration.

FIG. 10 shows an example of an HS-SICH configuration. An RTBS uses 32 bits, an RMF uses 12 bits, a channel variation (CHV) uses 20 bits, and an ACK/NACK signal uses 20 bits, thereby using 84 bits in total. That is, the total bit number assigned to the ACK/NACK is decreased by 20 bits in comparison with the conventional HS-SICH configuration. The RMF is 1-bit information, and is extended to 12 bits by using a repetition code. The RTBS is 6-bit information, and is extended to 32 bits by using a Reed-Muller code. The ACK/NACK signal is 1-bit information, and is extended to 20 bits by using the repetition code. The CHV is 2-bit information, and is extended to 20 bits by using the repetition code.

The order and the total bit number of the RTBS, the RMF, the CHV, and the ACK/NACK signal are shown for exemplary purposes only, and thus various modifications can be made.

Figure 11:
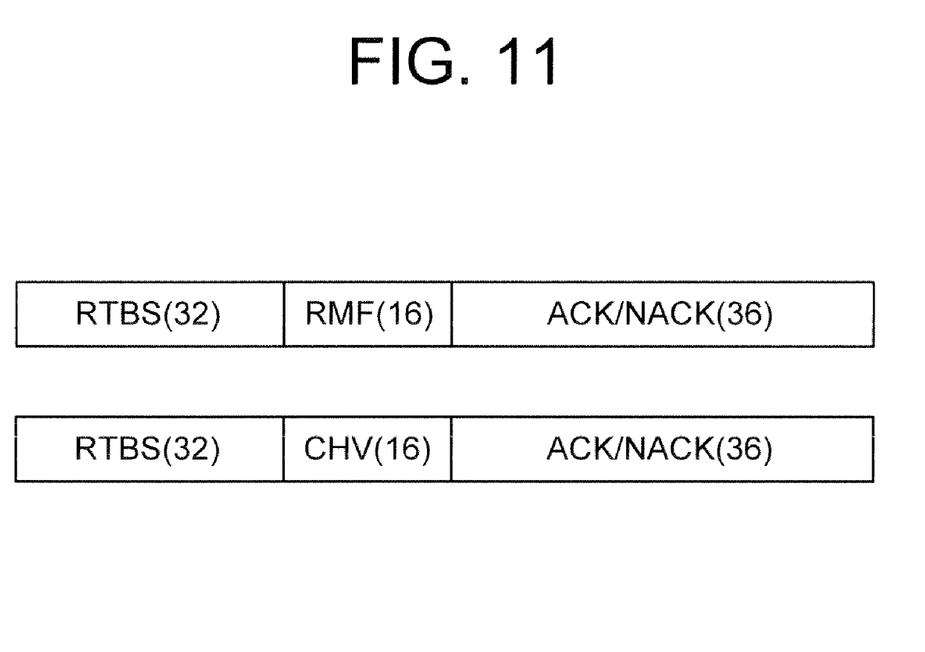
FIG. 11 shows another example of an HS-SICH configuration.

FIG. 11 shows another example of an HS-SICH configuration. Instead of transmitting an RMF in every HS-SICH, the HS-SICH is configured in two formats. In one format, the HS-SICH consists of an RTBS, an RMF, and an ACK/NACK signal. In the other format, the HS-SICH consists of an RTBS, a CHV, and an ACK/NACK signal. In general, the RMF varies depending on the RTBS. Therefore, performance does not significantly deteriorate even if the CHV is transmitted instead of the RMF.

A new bit may be additionally provided to the HS-SICH in order to indicate a specific format to be used selected from the two formats. In addition, through an additional channel, a BS (or UE) may inform a UE (or BS) of the specific format to be used selected from the two formats.

Figure 12:
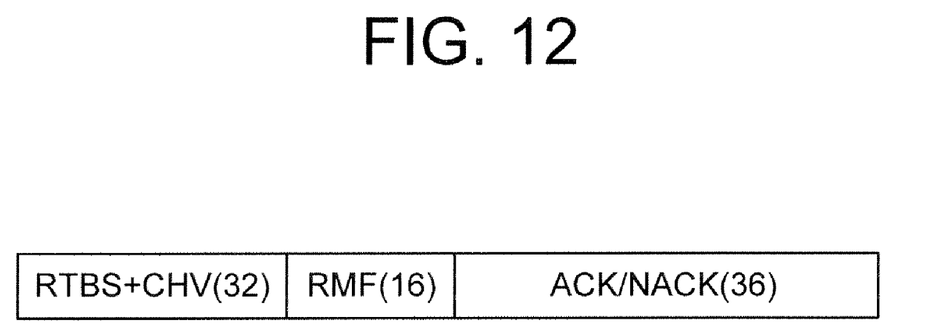
FIG. 12 shows another example of an HS-SICH configuration.

FIG. 12 shows another example of an HS-SICH configuration. The HS-SICH is configured by collectively encoding an RTBS and a CHV. For example, a 6-bit RTBS and a 2-bit CHV may be generated into 32 bits by using a 32×8 Reed-Muller code as shown in Table 2 below.

TABLE 2

| | $M_{i,0}$ | $M_{i,1}$ | $M_{i,2}$ | $M_{i,3}$ | $M_{i,4}$ | $M_{i,5}$ | $M_{i,6}$ | $M_{i,7}$ |
|---|---|---|---|---|---|---|---|---|
| 0 | 1 | 0 | 0 | 0 | 0 | 1 | 0 | 0 |
| 1 | 0 | 1 | 0 | 0 | 0 | 1 | 1 | 0 |
| 2 | 1 | 1 | 0 | 0 | 0 | 1 | 0 | 0 |
| 3 | 0 | 0 | 1 | 0 | 0 | 1 | 1 | 0 |
| 4 | 1 | 0 | 1 | 0 | 0 | 1 | 0 | 0 |
| 5 | 0 | 1 | 1 | 0 | 0 | 1 | 0 | 0 |
| 6 | 1 | 1 | 1 | 0 | 0 | 1 | 0 | 1 |
| 7 | 0 | 0 | 0 | 1 | 0 | 1 | 0 | 1 |
| 8 | 1 | 0 | 0 | 1 | 0 | 1 | 1 | 1 |
| 9 | 0 | 1 | 0 | 1 | 0 | 1 | 1 | 0 |
| 10 | 1 | 1 | 0 | 1 | 0 | 1 | 0 | 0 |
| 11 | 0 | 0 | 1 | 1 | 0 | 1 | 0 | 1 |
| 12 | 1 | 0 | 1 | 1 | 0 | 1 | 0 | 1 |
| 13 | 0 | 1 | 1 | 1 | 0 | 1 | 1 | 0 |
| 14 | 1 | 1 | 1 | 1 | 0 | 1 | 1 | 1 |
| 15 | 1 | 0 | 0 | 0 | 1 | 1 | 1 | 1 |
| 16 | 0 | 1 | 0 | 0 | 1 | 1 | 1 | 1 |
| 17 | 1 | 1 | 0 | 0 | 1 | 1 | 1 | 0 |
| 18 | 0 | 0 | 1 | 0 | 1 | 1 | 0 | 1 |
| 19 | 1 | 0 | 1 | 0 | 1 | 1 | 0 | 1 |
| 20 | 0 | 1 | 1 | 0 | 1 | 1 | 0 | 0 |
| 21 | 1 | 1 | 1 | 0 | 1 | 1 | 0 | 1 |
| 22 | 0 | 0 | 0 | 1 | 1 | 1 | 0 | 1 |
| 23 | 1 | 0 | 0 | 1 | 1 | 1 | 1 | 1 |
| 24 | 0 | 1 | 0 | 1 | 1 | 1 | 1 | 0 |
| 25 | 1 | 1 | 0 | 1 | 1 | 1 | 1 | 0 |
| 26 | 0 | 0 | 1 | 1 | 1 | 1 | 0 | 0 |
| 27 | 1 | 0 | 1 | 1 | 1 | 1 | 1 | 1 |
| 28 | 0 | 1 | 1 | 1 | 1 | 1 | 1 | 1 |
| 29 | 1 | 1 | 1 | 1 | 1 | 1 | 1 | 1 |
| 30 | 0 | 0 | 0 | 0 | 0 | 1 | 0 | 0 |
| 31 | 0 | 0 | 0 | 0 | 1 | 1 | 1 | 0 |

According to the present invention, a modulation and coding scheme is determined by considering changes in a channel environment. Therefore, reception performance of a user equipment is improved, and the user equipment can receive a service in a reliable manner.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. A method of transmitting channel information in a time division duplex (TDD) wireless communication system, the method comprising:
   receiving, at a user equipment from a base station, downlink data included in a radio frame, wherein the radio frame includes two subframes, each of the two subframes including one uplink time slot and six downlink time slots, each of the six downlink time slots including two data symbols and a midamble, wherein the downlink data is included in a plurality of downlink time slots, of the six downlink time slots, and wherein the downlink data is received through a high speed downlink shared channel (HS-DSCH);

obtaining, at the user equipment, received signal strength indications (RSSIs) of a plurality of midambles for the plurality of downlink time slots according to the equation $A_i=\sqrt{I^2+Q^2}$, wherein $A_i$ denotes an RSSI of a midamble for an $i^{th}$ downlink time slot of the plurality of downlink time slots, wherein I denotes an in-phase component of the midamble for the $i^{th}$ downlink time slot, and wherein Q denotes a quadrature-phase component of the midamble for the $i^{th}$ downlink time slot;

obtaining, at the user equipment, a moving average of the RSSIs of the plurality of midambles according to the equation $$M = \frac{1}{m}\sum_{i=0}^{m-1} A_i,$$

wherein M denotes the moving average of the RSSIs of the plurality of midambles, and wherein m denotes a number of the plurality of downlink time slots;

obtaining, at the user equipment, a dispersion of the RSSIs of the plurality of downlink time slots according to the equation $$v^2 = \frac{1}{m}\sum_{i=0}^{m-1} (M - A_i)^2,$$

wherein v denotes the dispersion of the RSSIs of the plurality of downlink time slots;

generating, at the user equipment, a channel quality indicator (CQI) including a channel variation indicating temporal changes of downlink channel condition, the channel variation being the dispersion of the RSSIs of the plurality of midambles for the plurality of downlink time slots; and transmitting, at the user equipment, the CQI to the base station through a high speed shared information channel (HS-SICH) which is a shared information channel for the HS-DSCH, wherein the channel variation and a recommended transport block size (RTBS) related to a coding scheme are jointly coded in the CQI.

2. The method of claim 1, wherein the channel variation in the CQI is extended by using a repetition code.

3. The method of claim 1, wherein the channel variation is divided into 4 states by using 2-bit mapping.

4. The method of claim 1, further comprising transmitting, by the user equipment, an acknowledgement/non-acknowledgement (ACK/NACK) signal to the base station through the HS-SICH.

5. The method of claim 1, wherein the CQI including the channel variation is transmitted through predetermined HS-SICHs among a plurality of HS-SICHSs.

6. The method of claim 5, wherein the CQI including a recommended modulation format (RMF) is transmitted through remaining HS-SICHSs among the plurality of HS-SICHSs.

7. A user equipment in a time division duplex (TDD) wireless communication system, the user equipment comprising:

a radio frequency (RF) unit configured for transmitting and receiving a radio signal; and a processor coupled to the RF unit, and configured for:

receiving, from a base station, downlink data included in a radio frame, wherein the radio frame includes two subframes, each of the two subframes including one uplink time slot and six downlink time slots, each of the six downlink time slots including two data symbols and a midamble, wherein the downlink data is included in a plurality of downlink time slots, of the six downlink time slots, and wherein the downlink data is received through a high speed downlink shared channel (HS-DSCH);

obtaining received signal strength indications (RSSIs) of a plurality of midambles for the plurality of downlink time slots according to the equation $A_i=\sqrt{I^2+Q^2}$, wherein $A_i$ denotes an RSSI of a midamble for an $i^{th}$ downlink time slot of the plurality of downlink time slots, wherein I denotes an in-phase component of the midamble for the $i^{th}$ downlink time slot, and wherein Q denotes a quadrature-phase component of the midamble for the $i^{th}$ downlink time slot;

obtaining a moving average of the RSSIs of the plurality of midambles according to the equation $$M = \frac{1}{m}\sum_{i=0}^{m-1} A_i,$$

wherein M denotes the moving average of the RSSIs of the plurality of midambles, and wherein m denotes a number of the plurality of downlink time slots;

obtaining a dispersion of the RSSIs of the plurality of downlink time slots according to the equation $$v^2 = \frac{1}{m}\sum_{i=0}^{m-1} (M - A_i)^2,$$

wherein v denotes the dispersion of the RSSIs of the plurality of downlink time slots;

generating a channel quality indicator (CQI) including a channel variation indicating temporal changes of downlink channel condition, the channel variation being the dispersion of the RSSIs of the plurality of midambles for the plurality of downlink time slots; and transmitting the CQI to the base station through a high speed shared information channel (HS-SICH) which is a shared information channel for the HS-DSCH, wherein the channel variation and a recommended transport block size (RTBS) related to a coding scheme are jointly coded in the CQI.

* * * * *